(12) United States Patent
Toivanen et al.

(10) Patent No.: US 11,258,188 B2
(45) Date of Patent: Feb. 22, 2022

(54) SHEARING SCREW

(71) Applicant: ENSTO OY, Porvoo (FI)

(72) Inventors: Antti Toivanen, Porvoo (FI); Hannele Kenkkilä, Kerava (FI)

(73) Assignee: Ensto Oy, Porvoo (FI)

( * ) Notice: Subject to any disclaimer, the term of this patent is extended or adjusted under 35 U.S.C. 154(b) by 493 days.

(21) Appl. No.: 16/201,412

(22) Filed: Nov. 27, 2018

(65) Prior Publication Data

US 2019/0165497 A1  May 30, 2019

(30) Foreign Application Priority Data

Nov. 29, 2017 (FI) .................................... 20176073

(51) Int. Cl.
| | |
|---|---|
| *H01R 4/36* | (2006.01) |
| *F16B 31/02* | (2006.01) |
| *H01R 4/56* | (2006.01) |
| *H01R 43/00* | (2006.01) |
| *F16B 2/06* | (2006.01) |
| *H01R 11/11* | (2006.01) |

(52) U.S. Cl.
CPC ............. *H01R 4/36* (2013.01); *F16B 31/021* (2013.01); *H01R 4/56* (2013.01); *H01R 43/00* (2013.01); *F16B 2/065* (2013.01); *H01R 11/11* (2013.01)

(58) Field of Classification Search
CPC .......... H01R 4/36; H01R 4/307; H01R 11/09; H01R 4/363; H01R 4/366; H01R 11/28; H01R 4/30; F16B 31/021; F16B 2/065; F16B 31/00; F16B 35/005; F16B 13/143; F16B 23/0038; F16B 35/042

USPC ......................................... 411/1–4, 367, 916
See application file for complete search history.

(56) References Cited

U.S. PATENT DOCUMENTS 5,927,917 A    7/1999  Gibbons
6,042,430 A *  3/2000  Hollick ................ F16B 31/021
                                                       439/797

(Continued)

FOREIGN PATENT DOCUMENTS

DE    10 2015 102223 A1    8/2016
EP         284 6052 A1     3/2015

(Continued)

OTHER PUBLICATIONS

Extended European Search Report for EP 18207190.2 dated Apr. 15, 2019, 7 pages.

(Continued)

*Primary Examiner* — Edwin A. Leon
*Assistant Examiner* — Matthew T Dzierzynski
(74) *Attorney, Agent, or Firm* — Alston & Bird LLP (57) ABSTRACT

The disclosure relates to a shearing screw for clamping an electrical conductor within a cable connector. The shearing screw comprises a screw body for engaging the cable connector, which further comprises an outer thread and a clamping surface for clamping the electrical conductor within the cable connector. The screw body also comprises a collar and a groove for detaching the collar from the screw body, whereas the shearing screw comprises a nut for shearing the shearing screw. The collar and the nut are adapted to be rotatable simultaneously with a sleeve for fastening the shearing screw to the cable connector.

13 Claims, 4 Drawing Sheets

(56) References Cited

U.S. PATENT DOCUMENTS

| | | | | |
|---|---|---|---|---|
| 6,321,624 B1* | 11/2001 | Croton | .................. | F16B 31/021 |
| | | | | 81/119 |
| 8,425,265 B2* | 4/2013 | Stauch | .................. | H01R 4/363 |
| | | | | 439/814 |
| 8,430,001 B2* | 4/2013 | Ortiz | ....................... | B25B 13/06 |
| | | | | 81/124.1 |
| 8,668,419 B2* | 3/2014 | Hardt | .................... | F16B 31/021 |
| | | | | 411/5 |
| 8,978,523 B2* | 3/2015 | Stanfield | .............. | B25B 23/108 |
| | | | | 81/125 |
| 9,366,282 B2* | 6/2016 | Vallette | .................... | F16B 31/02 |
| 10,573,979 B2* | 2/2020 | Toivanen | ................ | F16B 2/065 |
| 2012/0202393 A1 | 8/2012 | Stauch et al. | | |
| 2020/0040930 A1* | 2/2020 | Peltier | .................. | F16B 35/005 |

FOREIGN PATENT DOCUMENTS

| | | |
|---|---|---|
| WO | WO 2015/089501 A1 | 6/2015 |
| WO | WO 2016/054449 A1 | 4/2016 |

OTHER PUBLICATIONS

Finnish Search Report for Application No. 20176073 dated Apr. 6, 2018, 1 page.

\* cited by examiner

SHEARING SCREW

FIELD

The present disclosure relates to shearing screws for cable connectors, which may be used for low and medium voltage power lines. In particular, the disclosure relates to a shearing screw with multiple operation phases.

BACKGROUND

Cable connectors are used to join cables to other cables, for example by cable splicing, or to terminal bodies. By securing the cables within the connector by fasteners such as screws or bolts, the requirement for additional fastening devices in assembling the connection may be disposed of.

A particular type of cable connectors is one that is adapted for low and medium voltage power lines, such as in electrical grids. These cable connectors can be adapted for fasteners such as shearing screws which clamp the cable to the cable connector so that an electric connection is formed within the cable connector. For this purpose, the cable connector itself can be conductive to so that the electric current from the cable can be conducted through the connector. Shearing screws are particularly useful for certain types of installations including, for example, underground cables and installations where long-term durability is important and there is no need to repeatedly screw and unscrew the connectors.

Some of the existing shearing screws involve two-phase operation, where the screw is inserted into the cable connector and, in the first phase, tightened until a desired pressure is exerted on the cable. In the second phase the screw is sheared off, which in some concepts may be performed by using the structural features of the screw itself and the support from the connector body to direct the shearing force into the shearing screw. As the purpose of such screws, in the first place, is to simplify the installation, it is important that they can be used with ease and that they function reliably so that the pressure exerted by the screw on a cable, which is determined by the properties of the screw itself, is well-defined and the screw functions consistently upon installation. For these ends, it is likewise important that the manufacturing process of the screw can be controlled to produce consistently functioning screws as already small imperfections in the manufacturing process may cause the shearing screw become unusable, for example if the first phase of operation for the screw, i.e. the tightening phase, is not terminated properly and the pressure exerted on the cable consequently becomes too high or too low.

SUMMARY

An objective is to eliminate at least some of the drawbacks referred to above. In particular, an objective is to disclose a multi-phase shearing screw, which may be installed in a single external operation step visible to the user and where the internal operation involves reliably separable tightening and shearing phases.

By cable, it is meant here an elongated electrical conductor, which may be a transmission line in an electric power network. The cable connector is a device suitable for connecting one or more cables to each other or to an external body. For example, the cable connector may be a connector comprising two or more inlets for connecting cables to each other, for example spliced cables. The cables may be uncovered at the end entering the cable connector, so that they are exposed for direct galvanic contact. Word "inlet" has been used here as the inlets provide access in to the connector body, but it is acknowledged that, for example, the word "outlet" may be used interchangeably as the inlets also provide an exit point for the cables. The cable connector may also be a cable lug or a cable shoe (hereinafter "cable lug") for acting as a terminal connection for at least one cable, the cable lug having one or more inlets for cables. As the cable lug functions as a terminal connection for a cable, the cable connector may only connect the cable to external bodies and the cable remains electrically disconnected from any other cables within the cable connector.

By shearing screw (below also "screw"), it is meant here a screw element adapted for a portion to be sheared off upon installation. The shearing typically takes place in a cross-sectional plane of the screw where the plane is perpendicular or substantially perpendicular to the longitudinal direction of the screw. The screw is suitable for fastening the cable to the connector, for example by clamping the cable to the connector. The screws are threaded. The connector comprises at least one hole or bore for a screw, which may also be threaded and which are hereinafter referred to as "screw holes". It is noted that other expression such as a "shearing bolt" may also be used to describe the shearing screw.

By longitudinal direction, it is meant here the direction parallel to the longitudinal axis of the shearing screw, i.e., the axis along which the shearing screw is adapted to be screwed into the cable connector. Sides of the shearing screw and its parts are defined herein with respect to this longitudinal axis. Generally, the sides may be parallel or substantially parallel to the longitudinal axis. The front and rear ends of the shearing screw and its parts are defined with respect to the longitudinal direction so that the front end of the shearing screw and its parts is the end of the screw body adapted to engage the electrical conductor and the rear end is the opposite end in the longitudinal direction of the screw. Unless indicated otherwise, any planar projections in the disclosure are taken in the plane perpendicular to the longitudinal axis.

The shearing screw as disclosed may be used for cable connectors in electrical grids, e.g. low-voltage and/or middle voltage transmission lines. This may involve, for example, voltages of 1-36 kV. The screws required for this purpose are typically very strong, metallic screws having diameters of one or more centimeters, for example around two centimeters. Consequently, the force required to install them is also notable. The shearing screw may be installed under a sleeve such as a cold-shrink sleeve or a heat-shrink sleeve.

In a first aspect, a shearing screw for clamping an electrical conductor within a cable connector comprises a screw body for engaging the cable connector, the screw body, which comprises an outer thread and a clamping surface for clamping the electrical conductor within the cable connector. The screw body also comprises a collar and a groove for detaching the collar from the screw body. The shearing screw comprises a nut for shearing the shearing screw, the nut being adapted to engage the outer thread of the screw body. The collar and the nut are adapted to be rotatable simultaneously with a sleeve for fastening the shearing screw to the cable connector.

The construction of the shearing screw allows the fastening of the screw to take place in separate tightening and shearing steps with the shearing screw adapted to effect a clamping force, which may be determined by the construction of the shearing screw. When the force exerted by the shearing screw on the electrical conductor exceeds a threshold force, the collar is adapted to break off from the screw body with the help of the groove. After this tightening phase, the nut may rotate along the outer thread and the screw body until it engages the surface of the cable connector. When supported on the cable connector, in the shearing phase, the nut then allows directing tensile force into the screw body and thus shearing off the screw body substantially at the intersection of the nut and the cable connector. Since the collar and the nut are simultaneously rotatable with a sleeve, the construction allows the internal multi-phase operation of the shearing screw to take place without any change in the way the person installing the screw interacts with the system. The sleeve may be a part of a tool such as a socket wrench or a spanner. Consequently, the shearing screw may be operated without manually removing any parts of the screw after the tightening phase or without replacing or readjusting the sleeve after the tightening phase. Since the sleeve directly and simultaneously exerts force on both the collar and the nut, it can both break the collar off from the screw body in the end of the tightening phase and shear the screw body using the nut at the end of the shearing phase. The sleeve encloses, at least partially, both the collar and the nut. A screw may thus be installed by initially placing the sleeve on the screw and then only rotating the sleeve until the screw is sheared. The construction of the screw allows both a fixed clamping force to be automatically exerted on the conductor and the shearing screw to be sheared automatically, the person performing the installation effectually observing the installation taking place in a single installation step.

In an embodiment, the collar and the nut are adapted to maintain a constant relative angular orientation with respect to each other during rotation when fastening the shearing screw. This allows simplified operation of the shearing screw and the force exerted on the sleeve to be fully transferred to both the collar and the nut with simultaneous static friction between the nut and the sleeve as well as the collar and the sleeve. In addition, the installation process is sped up as the nut rotates already in the tightening phase, in synchronization with the screw body.

In an embodiment, the outer diameter of the collar substantially coincides with the outer diameter of the nut. The outer diameters here may correspond to the outer boundaries defined in the plane perpendicular to the longitudinal axis of the shearing screw. The outer boundaries may also be defined from projections of the nut and the collar into said plane. Matching the outer circumferences, including the diameters, of the nut and the collar simplifies contacting and rotating them simultaneously with a sleeve.

In an embodiment, the outer sides of the collar are flat in the longitudinal direction and the outer sides of the nut are at least partially flat in the longitudinal direction. This allows simplified contacting and rotating the nut and the collar with a sleeve having straight, parallel walls. The outer sides of the nut may be flat or they may be partially flat for example if also the nut comprises or is connected to a collar, which may be located at the bottom of the nut for engaging the cable connector. Even in this case, the outer sides of the nut may be flat in one end of the nut, the end being adapted to engage the sleeve.

In an embodiment, the collar has a polygonal outer boundary. This forms an improved gripping surface for force to be directed into the collar. It also allows conventional tools such as socket wrenches or spanners having polygonal sockets to be used in fastening the shearing screw. Also the nut may have a polygonal outer boundary. The polygonal outer boundary for the nut may be located at least in one end of the nut. The polygonal outer boundary for the nut may extend along the full length of the nut or only a partial length. The polygonal outer boundary may be, for example, a square boundary, a pentagonal boundary or an octagonal boundary. It may also be a hexagonal boundary, allowing interoperability with many types of tools.

In an embodiment, the shearing screw comprises a sleeve for simultaneously enclosing or enveloping, at least partially, and simultaneously rotating the collar and the nut. This allows the shearing screw to be fastened also using tools such as spanners which do not have an appropriate sleeve-like part for enclosing both the nut and the collar or the sleeve-like part is not long enough. The sleeve of the shearing screw may be detachable so that one sleeve may be used to fasten multiple shearing screws.

In a further embodiment, the sleeve has a polygonal inner and/or outer boundary. The shape of the inner boundary of the sleeve may be also different from the shape of the outer boundary of the sleeve, allowing the sleeve to function as an adapter between different types of tools for the nut and the collar. For example, the inner boundary may correspond to a first polygon and the outer boundary may correspond to a second polygon, wherein the first and the second polygons have different number of sides.

In another further embodiment, the length of the sleeve is larger than the length of the nut. When the nut and the collar are initially placed close to each other, the sleeve may simultaneously envelope both the nut and the collar while at the same time extend across the nut to be supported on the cable connector.

In another further embodiment, the inner surface of the sleeve is adapted to exert pressure on the collar and/or the nut to prevent the collar and/or the nut from moving with respect to the sleeve by itself. The pressure may be induced by dimensioning the sleeve together with the nut and/or the collar to provide a tight fit. This prevents parts of the shearing screw from dropping during installation. In particular, when the collar is tightly fitted into the sleeve, it can be carried with the sleeve after detachment in the end of the tightening phase. Also, the pressure-induced tight fit allows the nut and/or the collar to be detachably mounted in the sleeve so that they may be removed from the sleeve after installation of the shearing screw and the sleeve can be reused.

In another further embodiment, the sleeve is adapted to be supported on the cable connector during clamping of the electrical conductor. This allows using the sleeve and the cable connector body together to orientate the shearing screw and provide leverage when fastening the shearing screw.

In an embodiment, the screw body has a continuous shearing surface along the length of the screw body for facilitating shearing of the shearing screw at any length within the continuous shearing surface. The force or torque required for shearing the screw may be controlled by choice of materials of the screw body and by geometry of the screw body. Since no predetermined shearing point is required, the screw may be sheared off at the surface of the cable connector so that the end of the installed screw does not extend from the surface altering the electric fields or damaging cover materials placed on the cable connector.

In a second aspect, a method for clamping an electrical conductor to a cable connector using a shearing screw according to the first aspect or any of its embodiments is disclosed. The method comprises enveloping, at least partially, both the collar and the nut simultaneously with a sleeve for rotating the collar and the nut and rotating the sleeve to simultaneously rotate the collar and the nut to screw the screw body into the cable connector. The method further comprises continuing to rotate the sleeve to break the shearing screw at the groove, thereby causing the collar to detach from the screw body and continuing to rotate the sleeve until the nut engages the cable connector. Finally, the method comprises continuing to rotate the sleeve to transmit a tensile force through the nut to the screw body, thereby causing a portion of the screw body to shear off.

In an embodiment, the method comprises supporting the sleeve on the cable connector.

The shearing screw including the screw body, the nut and, optionally, the sleeve may be pre-installed together with the cable connector. This way, one or more cables may be installed into the cable connector simply by inserting the cables into the cable connector and rotating the shearing screw until it shears off. A ready-for-use arrangement therefore comprises a cable connector and a shearing screw as disclosed herein including any of the embodiments partially screwed in to the cable connector.

It is to be understood that the aspects and embodiments of the invention described above may be used in any combination with each other. Several of the aspects and embodiments may be combined together to form a further embodiment of the invention.

LIST OF FIGURES

The accompanying drawings, which are included to provide a further understanding of the invention and constitute a part of this specification, illustrate embodiments of the invention and together with the description help to explain the principles of the invention. In the drawings.

Like references are used to designate equivalent or at least functionally equivalent parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
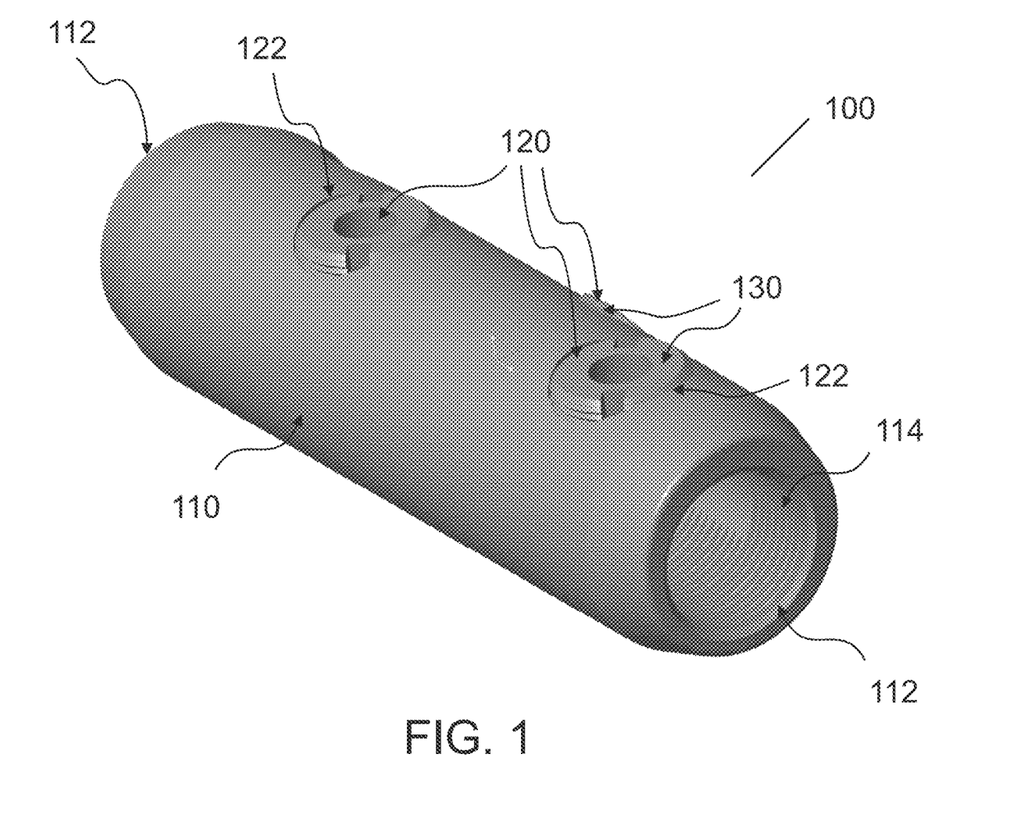
FIG. 1 illustrates a cable connector according to an embodiment.

FIG. 1 illustrates a cable connector 100 (below, referred to as "connector") according to an embodiment. The connector 100 has a body 110, the surface of which may be curved. The surface may also be smooth. The body 110 may be substantially cylindrical to allow convenient accommodation of cylindrical cables. The body 110 comprises one or more inlets 112 for cables, for example one or more inlet 112 when the connector 100 is a cable lug or two or more inlets when the connector 100 is adapted for connecting two cables together. The inlets 112 may be circular openings. The body 110 comprises a bore, which may be cylindrical, for accommodating one or more cables. The bore may be an open bore, but it may also be a closed bore, for example when the connector 100 is a cable lug. The bore may comprise threads or grooves 114 along the whole or partial length of the bore. The threads or grooves 114 may be adapted to form contact interfaces for transmitting electric current from a cable placed inside the connector into the body 110. Threads 114 may also be included for attaching the connector 100 to external bodies, for example to a collar or a flange. The diameter of the body 110, in the plane perpendicular to the longitudinal direction, may be, for example, 1-10 centimeters. The length of the body 110 may be, for example, 1-30 centimeters. The body 110 or the whole connector 100 may be made of rigid material. In particular, the body 110 or the connector 100 may be made of metal.

The connector 100 comprises one or more screw holes 120 (pictured here with screws 130 within) in the body 110. The number of holes may be, for example, from one to ten. For example, the number may be one for a cable lug, or two or four for a connector suitable for two cables. The holes 120 may be cylindrical. The holes 120 have edges 122, which may be substantially circular or oval or, in particular when the surface of the body 110 is curved, whose planar projection may be circular or oval. The holes 120 may extend transversely with respect to the longitudinal direction of the body 110. For example, the holes 120 may extend radially towards the central axis of the body 110. The holes 120 may, for example, be positioned in a single line or in two lines (the latter alternative pictured). The holes 120 may comprise threads for the screws 130.

An electrical conductor (also "cable") may be a single-wire conductor or a multi-wire conductor. It may comprise or be made of metal, for example of aluminum or copper. The expression "electrical conductor" may also be replaced by the expression "elongated body" where the disclosure relates to mechanical properties of the shearing screw 130.

Even though the connector 100 has been illustrated in FIG. 1a to comprise two inlets 112, the number and/or positioning of the inlets 112 may also differ. For example, the connector 100 may comprise two or more inlets positioned perpendicularly with respect to each other in a transverse dimension of the connector 100.

In an embodiment, the body 110 is joined with a second body to form a cable connector, the combination which may form a monolithic body. For example, the body 110 may be joined with an extension providing an attachment point through which the connector 100 may be attached to an external object. In particular, an attachment point may be included when the connector 100 is a cable lug.

Figure 2A:
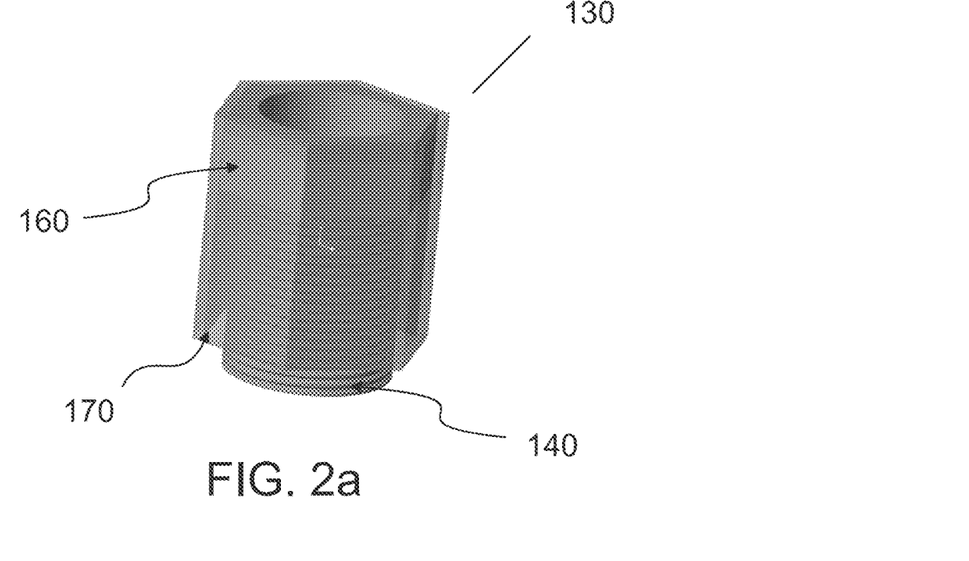
FIG. 2a illustrates a shearing screw according to an embodiment.

FIG. 2a illustrates a shearing screw 130 according to an embodiment. The shearing screw 130 is adapted for multi-phase operation comprising a tightening phase and a shearing phase, wherein the two phases are separate with respect to each other. The screw 130 comprises a screw body 140 with an outer thread and a nut 160 with a matching inner thread. Additionally, the shearing screw may comprise a sleeve 170. The sleeve 170 may also be provided by a tool for fastening the shearing screw 130 such as a socket wrench or a spanner. The screw body 140 may be made of electrically conductive material, for example metal. The nut 160 may be of same material as the screw body, for example metal, but it may also be made of a different material. The screw body 140 is adapted to engage a screw hole 120 in a cable connector 100, clamp a cable within the connector 100 and shear off after a clamping connection has been made. The shearing off prevents the screw 130 from extending from the outer surface of the connector 100. To facilitate shearing and to save material, the screw body 140 may be hollow. The screw body 140 may be adapted to shear when a force or torque exerted on the body 140 exceeds a threshold force or torque. The threshold force or torque for shearing may be controlled by, for example, choice of material of the screw body 140 or thickness of the walls 144 of a hollow screw body 140. It is also possible to make weakenings in the screw body 140 for shearing the shearing screw 130 but due to the construction of the screw 130, these are not required in the shearing phase. The walls 144 may be tapered, for example so that the inner diameter of the screw body 140 is smaller at the front end than at the rear end. However, the shearing mechanism of the screw 130 allows the walls 144 to be constructed also having a constant thickness.

Figure 2B:
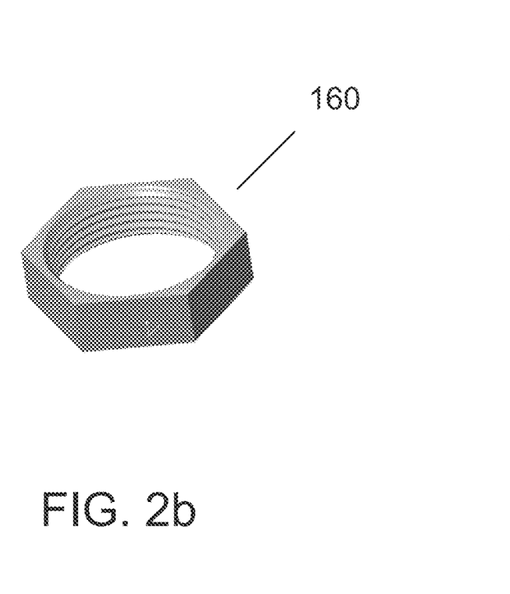
FIG. 2b illustrates a nut according to an embodiment.

FIG. 2b illustrates a nut 160 according to an embodiment. The nut 160 is adapted to shear the shearing screw 130 at the shearing phase. The nut 160 may be polygonal, for example square, pentagonal, hexagonal or octagonal. The nut 160 may have a flat front surface for engaging the cable connector 100. The nut 160 may also have a flat rear surface. It is noted that the nut 160 may comprise or be joined with extensions such as a collar (not illustrated). However, the outer side walls of the nut 160 may also be flat in the longitudinal direction (illustrated) or at least partially flat, particularly so that the side walls of the nut are flat in one end of the nut, the end being adapted to engage the sleeve 170. The dimensions of the nut 160 may be adjusted based on the application and the nut 160 can also be made relatively short, for example 0.5-3 centimeters in length.

Figure 2C:
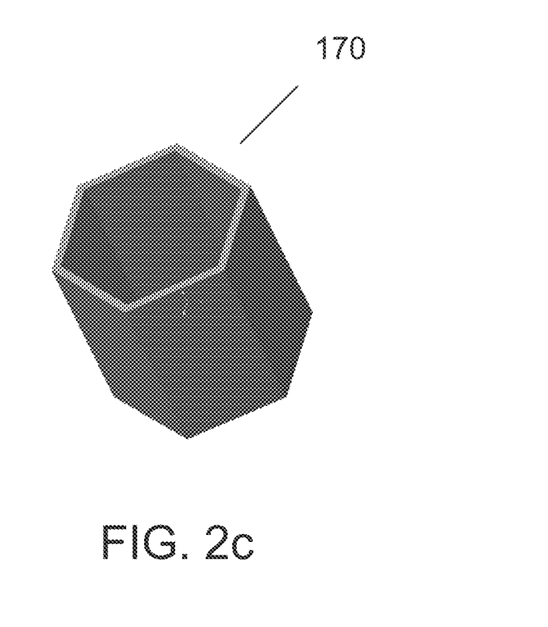
FIG. 2c illustrates a sleeve according to an embodiment.

FIG. 2c illustrates a sleeve 170 according to an embodiment for simultaneously enveloping or enclosing at least a part of the nut 160 and at least a part of the screw body 140. The sleeve 170 may also be adapted to simultaneously enclose either or both the nut 160 and the screw body 140 on their full length. The sleeve 170 may be as long or longer than the screw body 140 so that it may enclose the screw body 140 along the whole length of the screw body 140. In any case, the sleeve is adapted to simultaneously rotate the nut 160 and the screw body 140 in the tightening phase. The sleeve 170 may be polygonal, for example square, pentagonal, hexagonal or octagonal. The sleeve 170 may have a flat front surface for engaging the cable connector 100. The sleeve 170 may also have a flat rear surface. The sleeve 170 may be a part of a tool or it may be an independent element. The sleeve 170 may be detachable or it may be fixed to the shearing screw 130 for example at the nut 160, at the screw body 140 or at both. The dimensions of the sleeve 170 may be adjusted based on the application and, for example, the walls of the sleeve 170 may be made thin, e.g. 0.1-1 centimeters. The walls of the sleeve 170 may be parallel or substantially parallel to the longitudinal direction. The inner and/or outer surfaces of the walls may be flat in the longitudinal direction.

Figure 3:
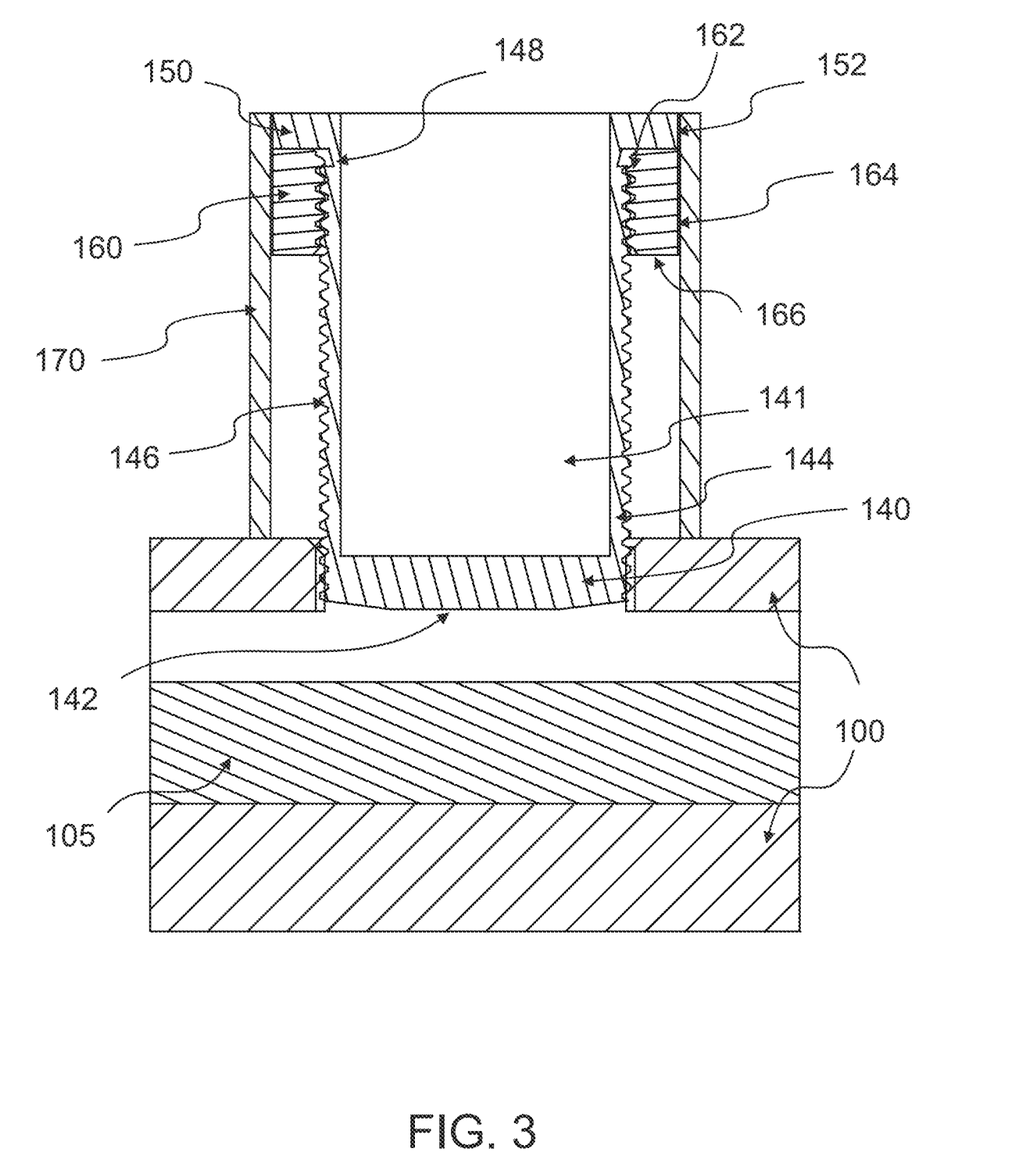
FIG. 3 illustrates a cable connector according to an embodiment with a shearing screw inserted therein in a cross-sectional view.

FIG. 3 illustrates a cable connector 100 according to an embodiment with a shearing screw 130 inserted therein in a cross-sectional view in a plane parallel both to the longitudinal direction of the cable connector 100 and the longitudinal direction of the shearing screw 130. In the figure, an electrical conductor 105 placed in the connector 100 for clamping is also illustrated.

The screw body 140 may be cylindrical, for example tubular. It may have an elongated shape so that its length exceeds its width, for example by being two times the width or even more. The screw body 140 may be hollowed by a longitudinal bore 141. This allows the force or torque required to shear off the shearing screw to be reduced and controlled. While not necessary for functioning of the screw, it also allows an additional pressure element to be inserted into the shearing screw. The bore 141 may be, for example, cylindrical. The screw body 140 may have outer walls 144 that are thinner than the diameter of the body 140. The thickness of the outer walls 144 and/or the material of the body 140 may be adapted so that the body 140 shears off under a force or torque, which may be predetermined. For example, the body 140 may have a threshold force or torque for shearing so that a force or torque exceeding the threshold force or torque shears the body 140. The threshold force or torque may, for example, be defined in the longitudinal direction of the screw 130. This way, it is not necessary to predetermine the exact point or line where shearing takes place but instead the screw 130 may be adapted to shear at a length determined based on properties of the electrical conductor 105 such as thickness.

However, the tightening phase takes place prior to the shearing phase. To determine when the tightening phase ends, i.e. when a desired force or pressure has been applied on the electrical conductor 105, a groove 148 has been arranged on the screw body 140. The groove 148 may be annular. The groove 148 may extend continuously around the circumference of the screw body 140 or it may be discontinuous. The groove 148 may be arranged on the outer surface of the screw body 148 but, in particular when the screw body 140 comprises a bore, the groove 148 may also be arranged on the inner surface of the screw body 140. The depth of the groove may be adapted to provide a threshold torque or force for the rear part of the screw body 140 to break off. This allows controlling and predetermining the threshold torque or force. In particular, the groove 148 allows both solid and hollow screw bodies 140 to be used in the shearing screw 130.

The screw body 140 has a front end for engaging the cable connector 100 and a rear end at the opposite end. One or both ends of the body 140 may be open or either or both of them, in particular the front end, may be closed. A closed end may comprise a supporting surface in the inner side of the screw body 140 for a pressure element to be inserted within the body 140. The supporting surface may be, for example, flat or tapered. In the front end, a clamping surface 142 is arranged on the external surface of the screw body 140. The clamping surface 142 may be, for example, a circular surface. It may be ring-shaped, formed for example by the bottom ends of the walls 144, or it may have a united shape, formed for example by a closed front end of the body 140. The clamping surface 142 may be flat or substantially flat. The clamping surface 142 may also comprise a conical tapering towards its edge. The screw body 140 comprises an external thread 146. The thread 146 may extend the whole length of the screw body 140 or it may cover only a part of the body 140. The thread 146 may have a constant pitch. The pitch of the thread may be adapted for the connector 100 so that it may be equal to the pitch of the screw holes 120 of the connector 100.

The shearing screw 130 also comprises a collar 150, which may be formed as a flange adapted to transmit torque. The collar 150 may form a monolithic part of the screw body 140. The collar 150 may extend radially outwards from the walls 144 of the screw body 140. The collar 150 may be polygonal, for example square, pentagonal, hexagonal or octagonal. The collar 150 may have a flat front and/or rear surface. The collar 150 comprises outer sides or outer side walls 152 which may face substantially perpendicularly to the longitudinal direction of the shearing screw 130. The collar 150 may form the rear end of the screw body 140 (illustrated) or the screw body 140 may extend on both sides of the collar 150 in the longitudinal direction of the shearing screw 130. In any case, the collar 150 is arranged after the groove 148 in the longitudinal direction of the screw body 140, i.e. so that the groove 148 is positioned between the collar 150 and the front end of the screw 130. This allows the collar 150 to be detached from the screw body 140 in the end of the tightening phase. For example, the groove 148 may be positioned directly below the collar 150. The external thread 146 of the screw body 140 may extend up to the collar 150 or there may be a threadless region between the collar 150 and the external thread 146. The groove 148 may be positioned on the external thread 146 or on a threadless region.

The nut 160 is adapted to shear the shearing screw 130, in the shearing phase, by transmitting tensile force into the screw body 140. The length of the nut 160 may be smaller than the length of the screw body 140 or even much smaller, e.g. less than a quarter of the length of the screw body 140. The nut comprises an inner thread 162, which is adapted to engage the outer thread 146 of the screw body 140. The inner thread 162 may extend along the whole length or only a partial length of the nut 160. The inner diameter of the nut 160 is equal or substantially equal to the outer diameter of the screw body 140. The nut 160 comprises outer sides or outer side walls 164 which may face substantially perpendicularly to the longitudinal direction of the shearing screw 130. The nut 160 may further comprise a bearing surface 166 for introducing tensile force into the nut 160 when the bearing surface 166 engages the cable connector 100. The bearing surface 166 may be circular and it may be adapted to enclose the screw body 140. The bearing surface 166 may project outwards from the outer side 164 of the nut 160 or it may align with the outer side 164 (illustrated). For a nut 160 having completely flat outer side wall 164, the bearing surface 166 may not extend beyond the outer side 164. It may also be flat or substantially flat to smoothly rotate against the cable connector 100. The nut 160 may be pre-installed on the screw body 140 at a position remote from the clamping surface 142 to guarantee that the shearing screw 130 may engage the electrical conductor 105 before the nut 160 engages the cable connector 100.

The screw body 140 may have a continuous shearing surface along the length of the body 140 for facilitating shearing of the shearing screw 130 at any length within the continuous shearing surface. The shearing screw 130 may even be adapted so that the shearing surface extends substantially the whole length of outer thread 146 the screw body 140. In any case, the location of shearing may be determined by the intersection of the cable connector 100, the bearing surface 166 and the screw body 140. The construction of the shearing screw 130 allows the shearing to take place in a flat shearing plane, which may be substantially perpendicular to the longitudinal axis of the screw body 140. The shearing plane may be located substantially on the surface of the cable connector 100. In this way, the screw 130 after being sheared off neither substantially extends from the screw hole 120 nor forms a recess in the screw hole 120. The nut 160 may be adapted to remain in one piece throughout the fastening of the shearing screw 130. After installation of the shearing screw 130, the nut 160 may be removed with the sheared off portion of the screw body 140.

In an embodiment, the collar 150 and the nut 160 are adapted to maintain a constant relative angular orientation with respect to each other during rotation when fastening the shearing screw 130. The shearing screw 130 is adapted so that the constant angular orientation may be preserved through the whole fastening process, including the tightening phase and the shearing phase.

The outer dimensions and shapes of the collar 150 and the nut 160 may be matched with each other. For example, the collar 150 may have an outer surface or side 152 and the nut 160 may have an outer surface or side 164 so that the planar projections of the outer surfaces or sides 152, 164 of the collar and the nut substantially coincide. The outer surface or side 152 of the collar 150 and the outer surface or side 164 of the nut 160 may be parallel or substantially parallel to the longitudinal axis of the shearing screw 130.

In an embodiment, the length of the sleeve 170 is larger than the length of the nut 160. The length of the sleeve 170 may be adapted so that the sleeve 170 can be supported on the cable connector 100 during fastening of the screw 140. For this end, the length of the sleeve 170 may be equal to or larger than the distance between the collar 150 and the clamping surface 142 but it may also be smaller, since the shearing screw 130 may also be pre-installed with the screw body 140 partially screwed into the cable connector 100.

In an embodiment, the sleeve 170 has an inner surface adapted to exert force or pressure on the collar 150 and/or the nut 160. The force or pressure is high enough to prevent the collar 150 and/or the nut 160 from moving with respect to the sleeve 170 by itself. This may correspond to a force or pressure higher than that corresponding to the effect of gravity, i.e. a force corresponding to an acceleration of 10 meters per second squared. However, the force or pressure exerted by the sleeve 170 may be adapted to be low enough for the collar 150 and the nut 160 to be removable from the collar 170 after fastening the shearing screw 130. The strength of the force or pressure may be adapted, for example, through the relative dimensions of the sleeve 170 and the collar 150 and/or the nut 150 or through the materials of any of the sleeve 170, the collar 150 or the nut 160, for example through the elastic properties of the materials.

Figure 4:
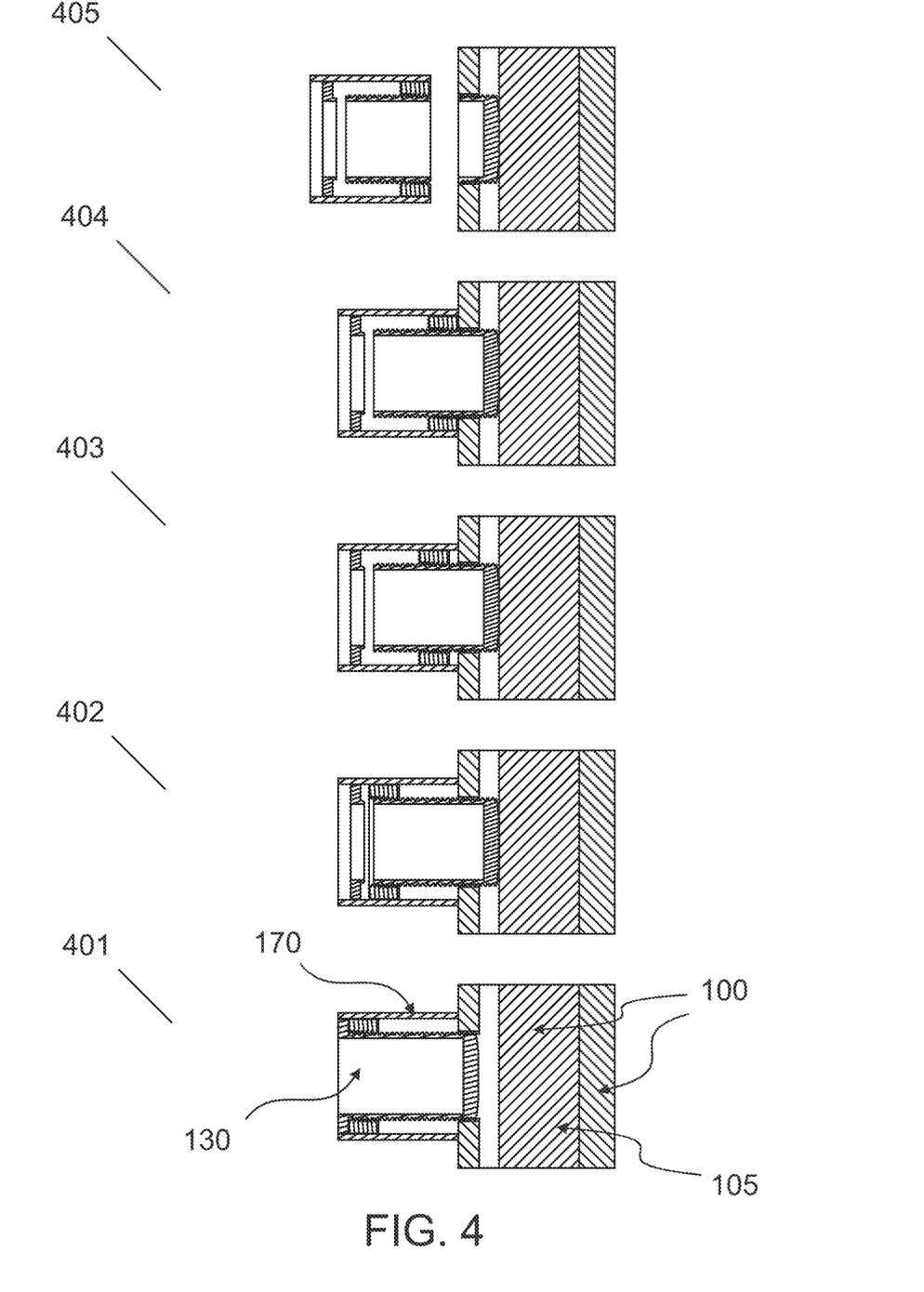
FIG. 4 illustrates the process of fastening and shearing a shearing screw according to an embodiment in a cross-sectional view.

FIG. 4 illustrates a cable connector 100 according to an embodiment with a shearing screw 130 inserted therein in a cross-sectional view in a plane parallel both to the longitudinal direction of the cable connector 100 and the longitudinal direction of the shearing screw 130. In the figure, the insertion is shown in five steps (from bottom to top) and also an electrical conductor 105 placed in the connector 100 for clamping is illustrated.

First 401, the shearing screw 130 is engaged in a screw hole 120 in the cable connector 100. The sleeve 170 may be included in the shearing screw 130 or it may be part of a separate tool. The cable connector 100, the shearing screw 130 and, optionally, the sleeve 170 may already be pre-installed together or they may be connected together upon installation of the shearing screw 130. Both the collar 150 of the screw body 140 and the nut 160 are simultaneously enclosed or enveloped by the sleeve 170, at least partially, i.e. their outer sides or outer side walls 152, 164 are partially or fully covered by the sleeve 170 to allow simultaneous rotation of the collar 150 and the nut 160 by the sleeve 170. At this point, the nut 160 and the screw body 140 may be stationary with respect to each other and they may be held together by the sleeve 170 so that their relative angular orientation remains constant upon rotation. When the sleeve 170 is rotated, the rotating force or torque may be transmitted directly both to the screw body 140 through the collar 150 and to the nut 160. It could also be possible to directly rotate the screw body 140 or the collar 150, in which case the rotating force or torque is transmitted to the nut through the screw body 140 and indirectly through the sleeve 170.

For this purpose, the screw body 140 and/or the collar 150 may comprise an inner surface adapted as a gripping surface for rotation. Rotating the sleeve 170 directly however simplifies operation of the shearing screw 130, particularly in the later stages of the installation.

After the rotation has begun 402, the screw body 140 rotates in the screw hole 120 and the threads of the screw hole 120 contact the outer threads 146 of the screw body 140 to direct the screw body 140 towards the electrical conductor 105. This corresponds to a tightening phase, during which the screw body 140 becomes screwed into the cable connector 100 so that it engages the electrical conductor 105. The clamping surface 142 becomes pressed against the electrical conductor 105 so that a clamping force is exerted between the electrical conductor 105 and the screw body 140. The clamping force may be conducted substantially longitudinally within the screw body 140. As the shearing screw 130 is further rotated, the clamping force increases and may exceed a threshold force. This threshold force for tightening may correspond to the threshold force or torque for breaking off the screw body 140 at the groove 148. When the threshold force or torque is exceeded, the screw body 140 breaks off at the groove 148 causing the collar 150 to detach from the screw body 140. The threshold force or torque for tightening may be adapted for the cable connector 100 and/or the electrical conductor 105, for example based on material characteristics of the electrical conductor 105. For example any combination of the following may be adapted to control the threshold force or torque: material of the screw body 140, thickness of the walls 144 of the screw body 140, the depth of the groove 148 and the spatial extent of the groove 148. This allows the clamping force to be controlled so that the tightening phase ends when a desired force output has been reached.

After exceeding the threshold force or torque for tightening 403, the force or torque exerted, directly or indirectly, on the sleeve 170 no longer substantially causes tightening of the shearing screw 130. Movement of the screw body 140 with respect to the electrical conductor 105 is therefore substantially halted. Instead, force or torque exerted on the sleeve 170 continues to rotate both the collar 150 and the nut 160. This moves the nut 160 with respect to the screw body 140 without further substantially moving the screw body 140 with respect to the electrical conductor 105 so that the collar 150 may simply rotate in place. The nut 160 may be screwed, by rotation exerted through the sleeve 170, all the way along the length of the screw body 140 to engage the cable connector 100. In particular, this may take place without substantially effecting any further tightening.

Once 404 the bearing surface 166 of the nut 160 engages the cable connector 100, a supporting force is exerted from the cable connector 100 to the nut 160 and, in turn, transmitted to the screw body 140 through the contact effected by the outer threads 146 and the inner threads 162. The contact further allows a tensile force to be transmitted into the screw body 140 in the substantially longitudinal direction of the screw body 140. This way, the nut 160 may be adapted to transmit the tensile force in the longitudinal direction of the shearing screw 130 for shearing off the shearing screw 130.

When the tensile force exceeds 405 the threshold force or torque for shearing the screw body 140, a portion of the screw body 140 is sheared off. Due to the construction of the shearing screw 130, the sheared off portion of the screw body 140 together with the nut 160, the sleeve 170 and the previously broken off collar 150 may remain together as one piece. This improves ease of installation, particularly in difficult installation environments, as the parts do not inadvertently fall off. In addition, the installation may be performed in a simple manner by inserting the electrical conductor 105 into the cable connector 100, rotating the sleeve 170 and removing the sleeve 170 when the shearing screw 130 has sheared off. Once the collar 150 and the nut 160 are simultaneously enveloped or enclosed with the sleeve 170, partially or fully, the sleeve 170 may be kept in a constant position during the whole installation process including fastening the shearing screw 130 and shearing it off. The shearing screw 130 is adapted for the whole fastening process including tightening and shearing to be completed without pausing or interrupting the rotation, for example to readjust the sleeve 170 or tool.

In an embodiment, the sleeve 170 is supported on the cable connector 100 during installation. The sleeve 170 may be supported on the cable connector 100 during the entire installation process including fastening the shearing screw 130 and shearing it off. The length of the sleeve 170 may be adapted so that the sleeve 170 also simultaneously envelopes or encloses, partially or fully, both the collar 150 and the nut 160.

Any range or device value given herein may be extended or altered without losing the effect sought, unless indicated otherwise. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims. It will be understood that the above description is given by way of example only and that various modifications may be made by those skilled in the art.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

The invention claimed is:

1. A shearing screw for clamping an electrical conductor within a cable connector, the shearing screw comprising:
    a screw body for engaging the cable connector, the screw body comprising an outer thread and a clamping surface for clamping the electrical conductor within the cable connector;
    characterized by the screw body comprising a collar and a groove for detaching the collar from the screw body; and the shearing screw comprising a nut for shearing the shearing screw, the nut being adapted to engage the outer thread of the screw body; wherein the collar and the nut are adapted to be rotatable simultaneously with a sleeve directly and simultaneously exerting force on both the collar and the nut.

2. A shearing screw according to claim 1, wherein the collar and the nut are adapted to maintain a constant relative angular orientation with respect to each other during rotation when fastening the shearing screw.

3. A shearing screw according to claim 1, wherein the outer diameter of the collar substantially coincides with the outer diameter of the nut.

4. A shearing screw according to claim 1, wherein the outer sides of the collar are flat in the longitudinal direction and the outer sides of the nut are at least partially flat in the longitudinal direction.

5. A shearing screw according to claim 1, wherein the collar has a polygonal outer boundary.

6. A shearing screw according to claim 1, comprising a sleeve for simultaneously enclosing or enveloping, at least partially, and simultaneously rotating the collar and the nut.

7. A shearing screw according to claim 6, wherein the sleeve has a polygonal inner and/or outer boundary.

8. A shearing screw according to claim 6, wherein the length of the sleeve is larger than the length of the nut.

9. A shearing screw according to claim 6, wherein the inner surface of the sleeve is adapted to exert pressure on the collar and/or the nut to prevent the collar and/or the nut from moving with respect to the sleeve by itself.

10. A shearing screw according to claim 6, wherein the sleeve is adapted to be supported on the cable connector during clamping of the electrical conductor.

11. A shearing screw according to claim 1, wherein the screw body has a continuous shearing surface along the length of the screw body for facilitating shearing of the shearing screw at any length within the continuous shearing surface.

12. A method for clamping an electrical conductor to a cable connector using a shearing screw according to claim 1, the method comprising:
　　enclosing or enveloping, at least partially, both the collar and the nut simultaneously with a sleeve for rotating the collar and the nut;
　　rotating the sleeve to simultaneously rotate the collar and the nut to screw the screw body into the cable connector;
　　continuing to rotate the sleeve to break the shearing screw at the groove, thereby causing the collar to detach from the screw body;
　　continuing to rotate the sleeve until the nut engages the cable connector; and
　　continuing to rotate the sleeve to transmit a tensile force through the nut to the screw body, thereby causing a portion of the screw body to shear off.

13. A method according to claim 12, comprising supporting the sleeve on the cable connector.

* * * * *